INVENTOR.
Kurt Schlesinger
BY
Norman L. Mueller
Atty.

July 2, 1957 K. SCHLESINGER 2,798,114

DOT-ARRESTING, TELEVISION SCANNING SYSTEM

Filed Oct. 12, 1950 6 Sheets-Sheet 2

INVENTOR.
Kurt Schlesinger
BY
Foorman L. Mueller
Atty.

DOT-ARRESTING, TELEVISION SCANNING SYSTEM

Filed Oct. 12, 1950

INVENTOR.
Kurt Schlesinger
BY
Norman L. Mueller
Atty.

DOT-ARRESTING, TELEVISION SCANNING SYSTEM

Filed Oct. 12, 1950 6 Sheets-Sheet 4

INVENTOR.
Kurt Schlesinger
BY
Norman L. Mueller
Atty.

INVENTOR.
Kurt Schlesinger
BY
Zoorman L. Mueller
Atty.

DOT-ARRESTING, TELEVISION SCANNING SYSTEM

Filed Oct. 12, 1950 6 Sheets-Sheet 6

INVENTOR.
Kurt Schlesinger
BY
Zoorman L. Mueller
Atty

United States Patent Office 2,798,114

Patented July 2, 1957

2,798,114

DOT-ARRESTING, TELEVISION SCANNING SYSTEM

Kurt Schlesinger, Maywood, Ill., assignor to Motorola, Inc., Chicago, Ill., a corporation of Illinois Application October 12, 1950, Serial No. 189,731

10 Claims. (Cl. 178—5.4)

This invention relates generally to television scanning systems and more particularly to velocity modulation of the horizontal scanning motion.

In the past many systems of scanning have been proposed for use in the transmission and reception of scenes and pictures by television. Presently adapted standard scanning systems are based on the use of two interlaced fields which together include 525 lines. That is, each field includes 252½ lines and the two succeeding fields are interlaced so that between the two fields 525 lines are provided. The fields are reproduced 60 times per second so that a completely new picture is provided 30 times per second (or for each two fields). With the use of 525 lines per picture, the line frequency therefore becomes 15,750 cycles per second. It is well known that the use of interlaced horizontal lines results in greatly improved picture definition. It has also been proposed to further improve the definition of the picture by the use of interlaced dots rather than a continuous line in the horizontal scanning of the picture. It has been shown that the use of interlaced dots results in a substantial increase in the definition of the television picture which can be transmitted over a channel of a given bandwidth, such as over the presently used six megacycle channels. Line interlace provides an increase of vertical resolution as the number of lines possible with the same frame repetition rate and the same channel width is increased by a factor of $\sqrt{2}$. Dot interlace along the horizontal lines increases the horizontal resolution by a factor of 2, by placing another line of dots between the dots first scanned.

Interlacing of horizontal lines is relatively easy as the main direction of scanning is at right angles to the lines. This is not the case with dot interlace as the dots must be formed in the direction of scanning. This requires gating of the beam which results in a loss of brightness. This has been a particularly objectionable feature in color television systems wherein the dot interlacing system has been practiced. It therefore appears that further refinement of dot interlace techniques is desirable to retain the advantages of such systems as set forth above and to overcome the objections which have been characteristic of present dot interlacing systems.

It is therefore an object of the present invention to provide an improved scanning system in which the picture is composed of a plurality of dots.

A further object of this invention is to provide a television sweep system in which the horizontal sweep of the image reproducing beam is broken up into a plurality of substantially immobilized dots.

A still further object of this invention is to provide a dot interlace scanning system in which the horizontal sweep is velocity modulated so that the dots may be substantially stopped and displayed for a relatively long time and then moved to the next position relatively fast so that blanking of the beam during the rapid movement thereof does not substantially reduce the brightness of the reproduced picture.

Another object of this invention is to provide a dot arresting scanning system for use in color television systems so that the brightness and the color fidelity of the reproduced picture are improved.

A feature of this invention is the provision of a television scanning system in which the beam is scanned horizontally by a deflection field having a linear component and a fluctuating component which may be a sine wave, with the two components combining to provide velocity modulation of the horizontal sweep of the beam.

Another feature of this invention is the provision of a television receiver including a circuit for causing velocity modulated horizontal movement of the beam across the screen and blanking of the beam during the times of rapid movement whereby resolution of the reproduced picture is increased and the brightness thereof is not substantially decreased.

A further feature of this invention is the provision of a television sweep system for causing the cathode ray beam which reproduces the image to scan the screen horizontally in a discontinuous fashion and for providing blanking of the beam at the proper phase with respect to the movement thereof to provide maximum brightness and definition.

A still further feature of this invention is the provision of a scanning system for color television including means for substantially stopping the beam or beams producing the colored picture while the respective colors are being sampled to thereby reduce dot overlap and improve the fidelity of the reproduced color picture.

Still another feature of this invention is the provision of a color television system in which the picture is composed of arrested dots, which includes means for controlling the display of the various colors so that the individual dots may be displayed for a relatively long period as compared to the sampling period of the various primary colors.

Yet another feature of this invention is the provision of a dot arresting scanning system for color television wherein a group of dots are displayed during each arresting cycle, as for example the three dots of different primary colors which combine to form an element of the color television picture.

Further objects and features, and many attending advantages of the invention will be apparent from a consideration of the following description when taken in connection with the accompanying drawings in which.

In practicing the invention a television system is provided in which the horizontal scan of the picture is formed by a plurality of immobilized dots, instead of by a continuous line. To accomplish this the horizontal movement of the electron beam is velocity modulated so that the beam alternately moves very slow and then relatively fast. The beam is blanked during the rapid movement thereof and is displayed during the slow movement thereof, and is therefore displayed over a relatively large portion of the total time so that the brightness is not substantially reduced due to the blanking. The provision of dot arresting increases the brightness of the picture. As compared to dot interlacing with constant scanning speed and short display cycle, the dot arresting technique provides better signal to noise ratio in the transmitter and a brighter picture in the receiver. The phase and duration of the display portion of the cycle may be controlled with respect to the sampling pulses so that optimum brightness and sharpness may be obtained. Simple circuits are provided which are controlled by the sampling oscillator and which include auxiliary field coils for providing the arresting field for the beam as well as means for providing suitable broad gating pulses for controlling the blanking and display portions of the cycle. Such circuits may be applied to various color systems whereby the different colors are alternately displayed as immobilized dots to thereby provide high fidelity color rendition. Such systems for color television may provide relatively long display times as compared to the proposed dot interlace sampling technique. The arresting technique may also be applied to color television by arresting the dots of the individual colors as a group. This results in a simplification of the system and may provide high fidelity color reproduction.

Figure 1:
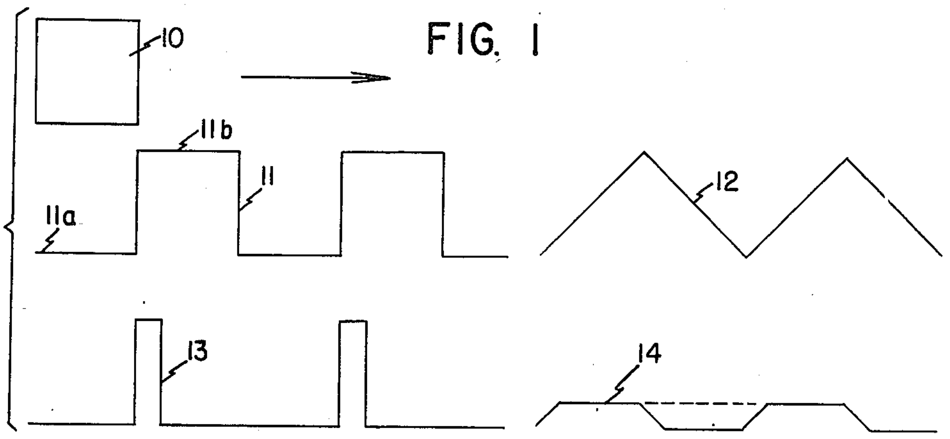
Fig. 1 illustrates present dot interlace techniques.

Referring now to the drawings, in Fig. 1 there is illustrated the known dot interlace technique wherein the beam is scanned horizontally in a linear manner and is intermittently blanked during the scan to provide a plurality of dots. In Fig. 1, 10 represents the spot of the reproducing tube which is moving to the right (as indicated by the arrow) across the screen of the tube. In all considerations the beam is shown, for the purposes of simplicity, as having a square cross section, but it will be understood that the beam produced by a cathode ray tube will not generally have such configuration. The curve 11 is a square gating wave which causes the beam to be blanked or displayed to form the dots. When the wave 11 is at low level, 11*a*, the beam is extinguished and when it is at high level, 11*b*, the beam is displayed. The curve 11 is of such configuration that the beam will be displayed 50% of the time. Curve 12 shows a brightness distribution of the dot formed when the beam is gated in accordance with the curve 11. It is apparent from the curve 12 that the peak brightness is the same as for continuous scanning and further that the dots adjoin each other, and are not clearly separated. Curve 13 is a gating wave as has been proposed for dot interlace in which the pulses producing the display of the beam are relatively short. This produces a brightness distribution as shown in curve 14. It is apparent that the distribution of curve 14 provides a very much reduced peak brightness, with the brightness being $2p$ where $p$ is the ratio of the pulse duration to the separation between pulses. As the ratio $p$ for curve 13 is 1/8, the peak brightness is 1/4 that of continuous scanning. This relation holds when the dimension across the dot is one half the dot separation. If the dot is smaller, the loss is greater. As stated above, Fig. 1 represents the conditions when a square beam is moved at a constant velocity and is gated by a rectangular wave with the gating pulses being of various durations.

Figure 2:
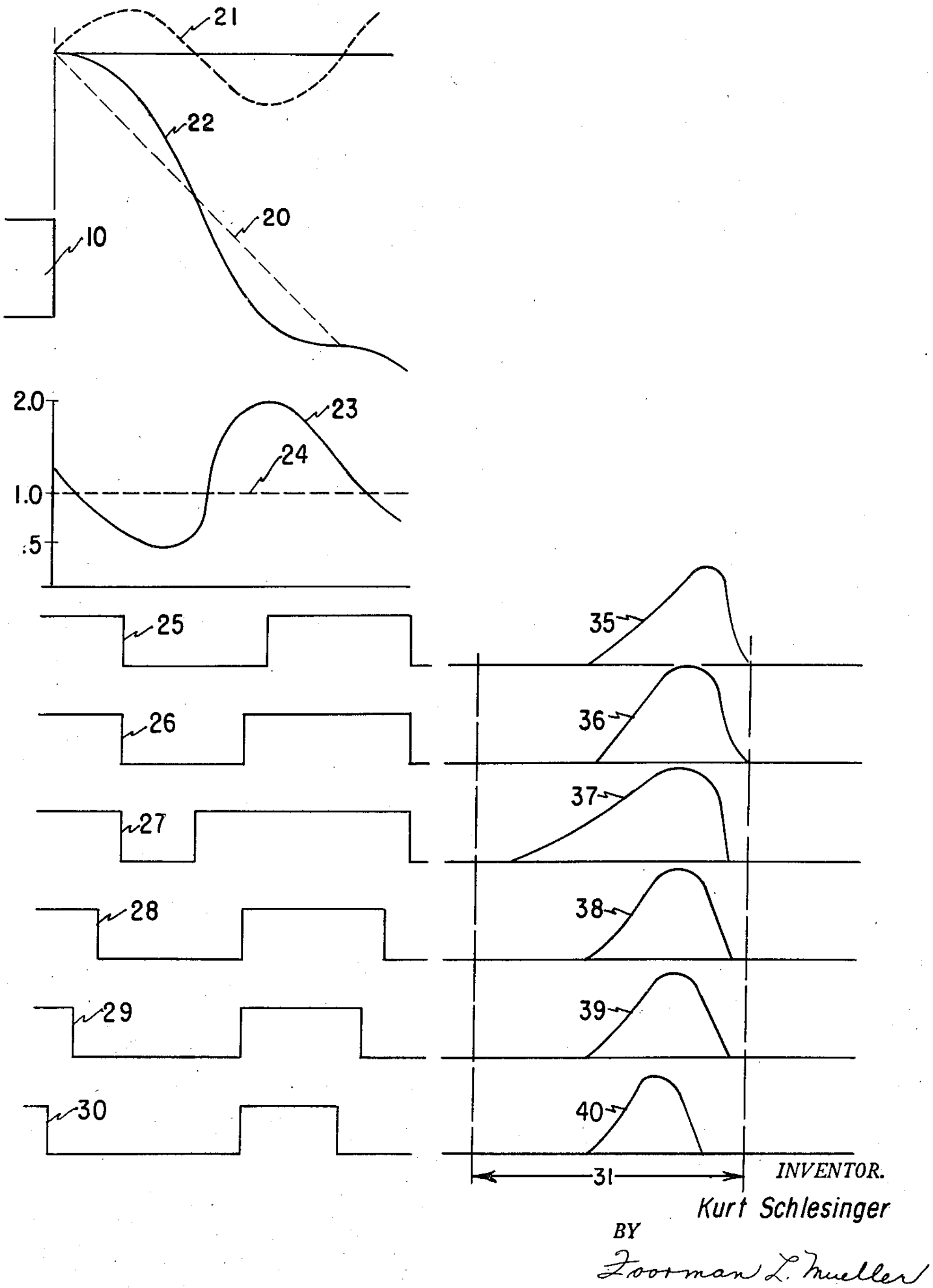
Fig. 2 illustrates the dot arresting scanning in accordance with the invention.

Fig. 2 illustrates the characteristics of the dots produced by an arrested scanning motion. In this figure, the dotted line 20 illustrates the normal linear horizontal scanning movement of the beam. The dotted curve 21 is a sine wave of relatively small amplitude and represents the arresting field. When the curves 20 and 21 are combined, a curve as shown by the solid line 22 is provided having substantially horizontal portions wherein the beam remains substantially at rest and portions which become very steep wherein the beam moves quite rapidly. Considering the movement of a beam 10 of square cross section as in Fig. 1 (in Fig. 2 only a portion of the beam is shown), the time required for the square beam to move past the various points along the horizontal line is shown by the curve 23. The dotted line 24 shows the time required for the beam to pass any point when scanned linearly and it is seen from the curve 23 that the time required during arrested scan varies from .5 to 2.0 the time required for linear scan. Curve 23 gives an indication of the brightness distribution of the beam, when not gated, as it moves horizontally in an arrested manner since the longer it takes for the beam to pass a point, the brighter will be the dot at this point.

In the systems of Fig. 1 and Fig. 2, the sampling frequency is so related to the horizontal frequency that the movement of the beam during each sampling cycle will be of the order of twice the transverse dimension of the beam. This results in the display of spaced dots so that other dots may be interspersed from another horizontal line. It is therefore obvious that the frequency of the arresting wave 21 will be much higher than the horizontal scanning frequency which provides a sawtooth wave having a linear trace of which the dotted line 20 in Fig. 2 is a part.

Curves 25, 26, 27, 28, 29 and 30 show gating waves which may be applied to the arrested beam to provide various different characteristics of the dot, both as to the maximum brightness and the width thereof. Curves 35, 36, 37, 38, 39 and 40 illustrate the width and brightness of the dots formed, with the height of each wave illustrating the brightness, and the extent of the base of the wave illustrating the width. The dot separation is shown by the space between the dotted lines and is indicated at 31. The gating wave 25 has a gating factor of 50% and is advanced in phase with respect to the arrestor wave 21 by 90°. The light distribution shown by the curve 35 has an amplitude substantially the same as for continuous scanning and has a base width substantially less than the dot spacing so that succeeding dots will be clearly separated. Comparing this with the systems of Fig. 1, it will be noted that the peak brightness is substantially the same as for the long sampling shown by curve 12. However, the width is much less so that the dots do not adjoin as in curve 12. Comparing curve 35 to curve 14 wherein short sampling is used, the separation of the dots is substantially the same but the peak brightness of the curve 35 is about 2.7 times that of curve 14.

The gating wave 26 is advanced 120° with respect to the arresting wave and has a gating factor of 58⅓%. This produces a light distribution curve 36 of substantially the same maximum brightness as the previous gating wave but having a somewhat greater width. The gating wave 27 is advanced by 180° with respect to the arresting wave and has a gating factor of 75%. This produces a dot 37 which again has about the same maximum brightness but which has a much wider base. The gating wave 28 is advanced by 120° and has a gating factor of 50%. This produces a dot 38 which extends slightly more than half the dot separation and having about the same maximum brightness as the previous curves. Gating wave 29 is also advanced 120° but has a duration of only 41⅔%. Such a gating wave produces a dot 39 which has a slightly less maximum brightness. The wave 30 is also advanced by 120° but has a duration of only 33⅓%. This results in further decrease in the maximum brightness of the dot 40 and also in a decrease in the width thereof.

It is apparent from curve 23 that the maximum dot transit time occurs slightly ahead of the points of slowest movement and not in phase with them. This is because of the finite size of the dots. It will be noted from the various curves shown in Fig. 2 that relatively large variations in the brightness distributions may be obtained by changing the gating waves, but on the other hand the gating wave is not unduly critical and will therefore not be difficult to produce. For black and white transmission it appears probable that the distribution produced by gating wave 25 in which the phase leads by 90° and the duration is 50% may be most desirable. For color systems, however, it is probable that the distribution produced by gating wave 30 will be most advantageous because of the shorter base width which will reduce the amount of dot overlap as will be more fully described.

Figure 3:
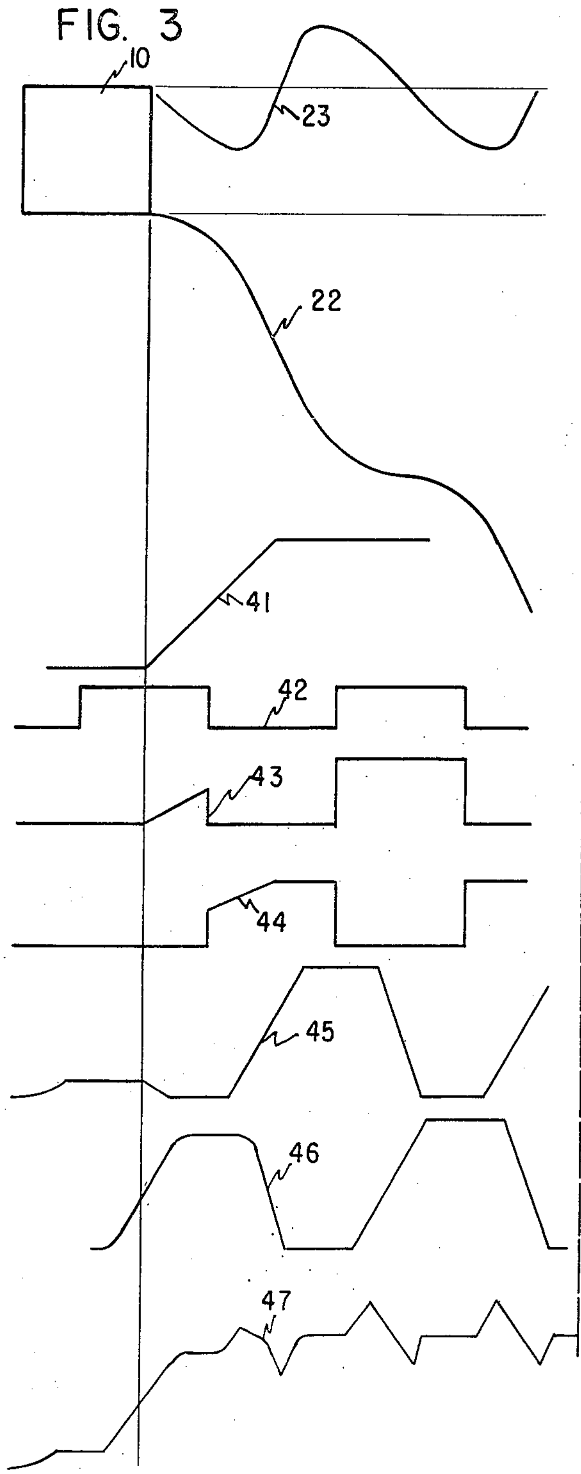
Fig. 3 illustrates the improved resolution resulting from the dot arresting system in accordance with the invention.

In order to consider the effect of the dot arresting scanning on resolution of the picture, it is necessary to consider the light distribution produced when going from a dark to a light area, for example. This is illustrated in Fig. 3 in which the rectangular spot is again illustrated at 10, the arrested movement is shown by curve 22, and the dot transit time is shown by curve 23. Curves 22 and 23 are exactly the same as in Fig. 2. Curve 41 illustrates a signal which results from scanning from a dark to a light area. Curve 42 is the gating wave which is 90° ahead of the arrestor field and has a gating factor of 50%. It will be understood, of course, that the scanning of successive lines will be interlaced with respect to each other so that the dots omitted during one scan will be filled in by the succeeding scan. Curve 43 shows the intensity of the dots formed by the gating pulse 42 and curve 44 illustrates the intensity of the dots formed during the next scan. Curves 45 and 46 illustrate the brightness distribution of the two succeeding lines and curve 47 illustrates the overall brightness resulting from the two lines superimposed upon each other. It is, of course, to be realized that curves 41, 42, 43 and 44 are drawn in the time domain and curves 45, 46 and 47 are in the space domain.

Figure 4:
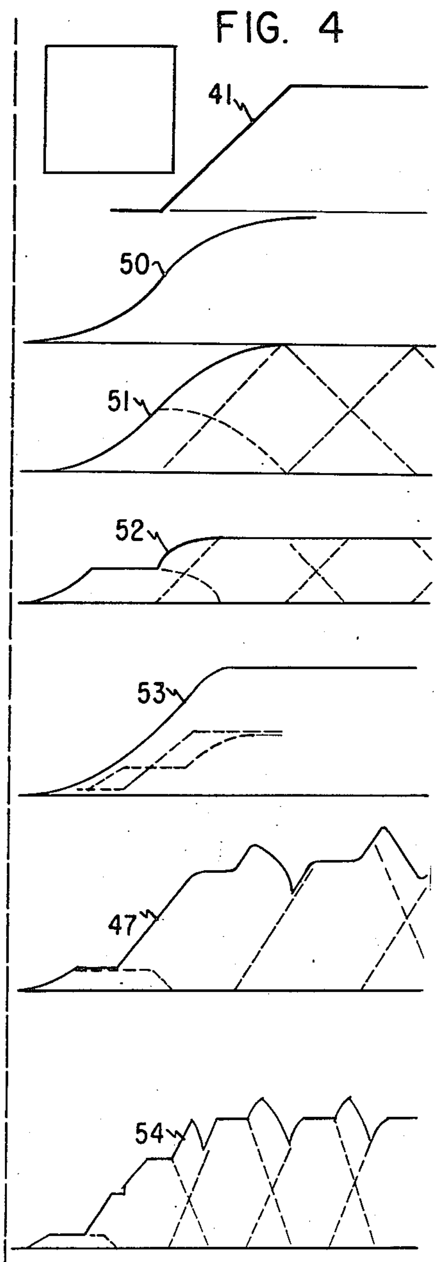
Fig. 4 shows by comparison the resolution of various different scanning systems.

In Fig. 4 there is illustrated a comparison of the light distribution caused by transition from black to white by various known scanning systems. Curve 41 again shows the signal in which there is a transition from black to white. Curve 50 shows the edge rendition provided by normal scanning and it is apparent that the transition is extended or smeared to twice the original width. This, of course, results in a decrease in sharpness. Curve 51 shows the use of dot interlace with standard scan and broad gating. This results in a broadening of the edge providing substantially the same results as normal scanning. Curve 52 illustrates dot interlace with narrow gating and it is apparent that the edge is sharper in this instance. However, as previously stated, the brightness of the picture is reduced by reducing the gating width. By doubling the frequency of the gating pulses, the sharpness provided by dot interlace with linear scan can be improved as is shown by curve 53. However, such a system requires an increased bandwidth and for this reason may be impractical. Curve 47, which was derived in Fig. 3, is also illustrated in Fig. 4 and shows that the edge rendition produced by the arrested dot interlace is much improved over normal dot interlace at the standard frequency, and is substantially the same as dot interlace at the double frequency as shown in curve 53. It is noted that the brightness curve resulting from the arrested dot interlace scanning is not completely flat but has a small residual brightness modulation which may be of the order of 20%. This dot-prominence or moire pattern is not of sufficient amplitude to be objectionable but may be reduced by increasing the frequency of the sampling pulses. This is illustrated in curve 54 wherein the frequency of the sampling pulses is increased by 50% as compared to those shown in curve 47. Thus, by increasing the frequency of the sampling pulses, sharpness is also improved.

Figure 5:
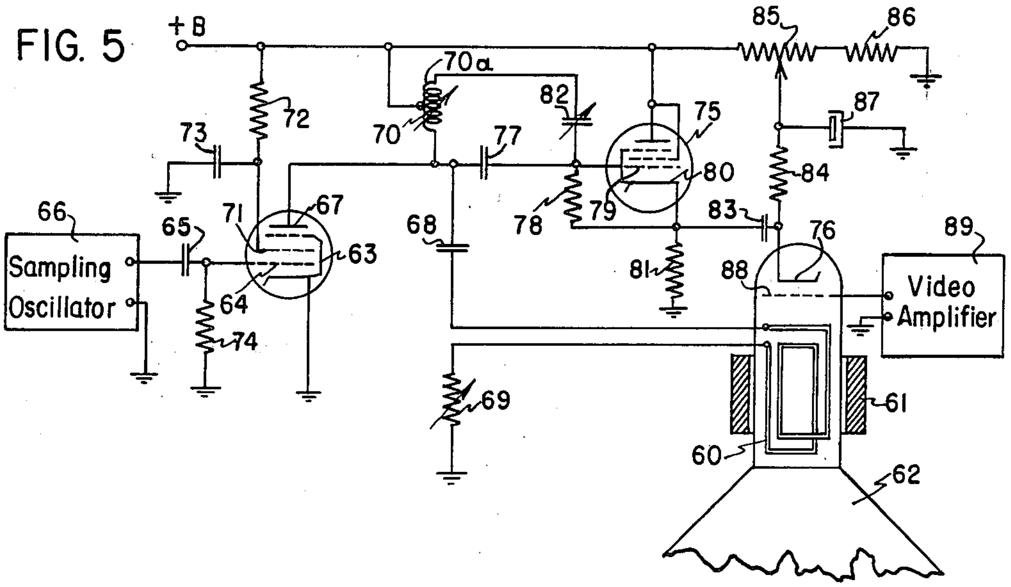
Fig. 5 represents a circuit suitable for application to a black and white television receiver for arresting and blanking the image reproducing beam.

Considering now the circuits which may be used for providing the arresting field and the gating wave, as is required in practicing the dot arresting technique, reference is made to Fig. 5. The arresting field may be produced by a small pair of field coils 60 placed about the neck of the tube 62 inside the standard deflection yoke 61. The yoke 60 may include two loops of flat copper strip each having a single turn. The arrestor field current is produced by the pentode tube 63 having a grid 64 connected through condenser 65 to the sampling oscillator 66 of a dot interlace scanning system. A frequency of the order of 3.8 megacycles has been proposed for this use. The arrestor yoke 60 is placed in the tuned plate circuit of the pentode 63, being connected to the plate 67 thereof through condenser 68, with the amplitude of the current being controlled by the series resistor 69. The plate 67 is connected to plus B through the variable inductor 70. The screen grid 71 of the pentode is connected to B plus through resistor 72 and bypassed by condenser 73. The control grid 64 of tube 63 is biased by resistor 74.

The gating wave is produced by a pentode tube 75 which functions as a grid controlled rectifier to provide a half wave voltage to the cathode 76 of the cathode ray tube 62. The plate voltage from the pentode tube 63 is applied through condenser 77 to the grid 79 of the pentode tube 75, and the cathode 80 thereof is grounded through resistor 81. The grid leak resistor 78 is adjusted to obtain clipped half wave output. An inverter winding 70*a* is closely coupled to winding 70 and connected in series with condenser 82 to the grid 79 to neutralize the grid-cathode capacity. The voltage at the cathode 80 is applied through condenser 83 to the cathode 76 of the cathode ray tube for intermittently extinguishing the beam thereof. Resistors 84, 85 and 86 and condenser 87 form a network connected to the cathode 76 for controlling the brightness of the picture tube. The grid 88 of the cathode ray tube may be connected to the usual video amplifier 89 which provides both the video signal and a D. C. component.

The circuit of Fig. 5 provides a quadrature relationship between the arrestor current and the blanking voltage. This relationship may be changed somewhat by adjustment of the inductor 70 and may be satisfactory in many applications. In some applications, it may be desired to change the phase relationship by a greater extent than that permitted by the single tuned circuit and this may be accomplished by the use of a double tuned circuit for the arresting wave generator as is shown in Fig. 6.

Figure 6:
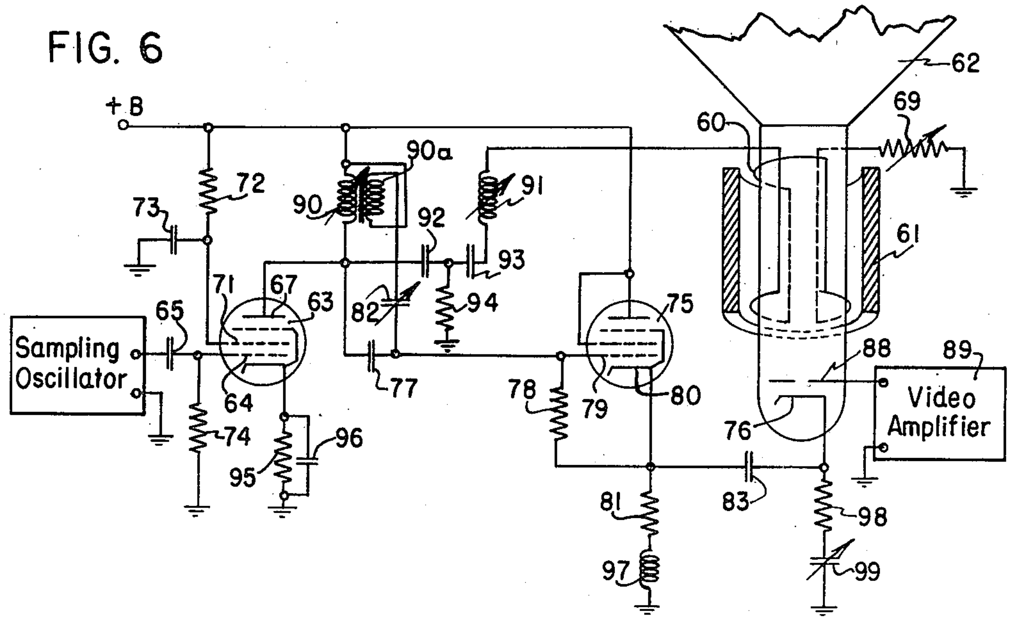
Fig. 6 is a modified circuit for arresting and blanking the beam of a television receiver tube.

In the double tuned circuit of Fig. 6, many of the components and connections are the same as in Fig. 5 and the same reference numbers are used to identify these common components. The plate circuit of the pentode 63 is a double tuned circuit including two tunable coils 90 and 91, condensers 92 and 93, and coupling resistor 94. The coil 90 connects the plate 67 of the tube 63 to plus B, and the coil 91 is coupled to the plate 67 through condensers 92 and 93 and is connected in series with the arrestor yoke 60 and the amplitude adjusting resistor 69 which is at ground. The cathode of the tube 63 is biased by resistor 95 bypassed by condenser 96.

The blanking wave is produced by the pentode 75, the grid 79 of which is connected to the plate 67 of the pentode 63 through condenser 77. Winding 90*a* and condenser 82 provide grid-cathode neutralization and the grid 79 and cathode 80 of the pentode 75 are interconnected by grid leak resistor 78, all as in Fig. 5. The cathode 80 is connected to ground through resistor 81 in series with inductor 97, and coupled to the cathode 76 of the cathode ray tube through condenser 83. A background control bias is provided to the cathode 76 of the cathode ray tube 62 through resistor 98 and variable condenser 99. By varying the inductor 91 the arrestor phase may be adjusted with respect to the blanking wave over a considerable range on either side of the normal 90° relationship. This would provide for an advance in phase of 120° as specified to be the optimum in color systems.

Figures 7, 10, 11, 12, 13:
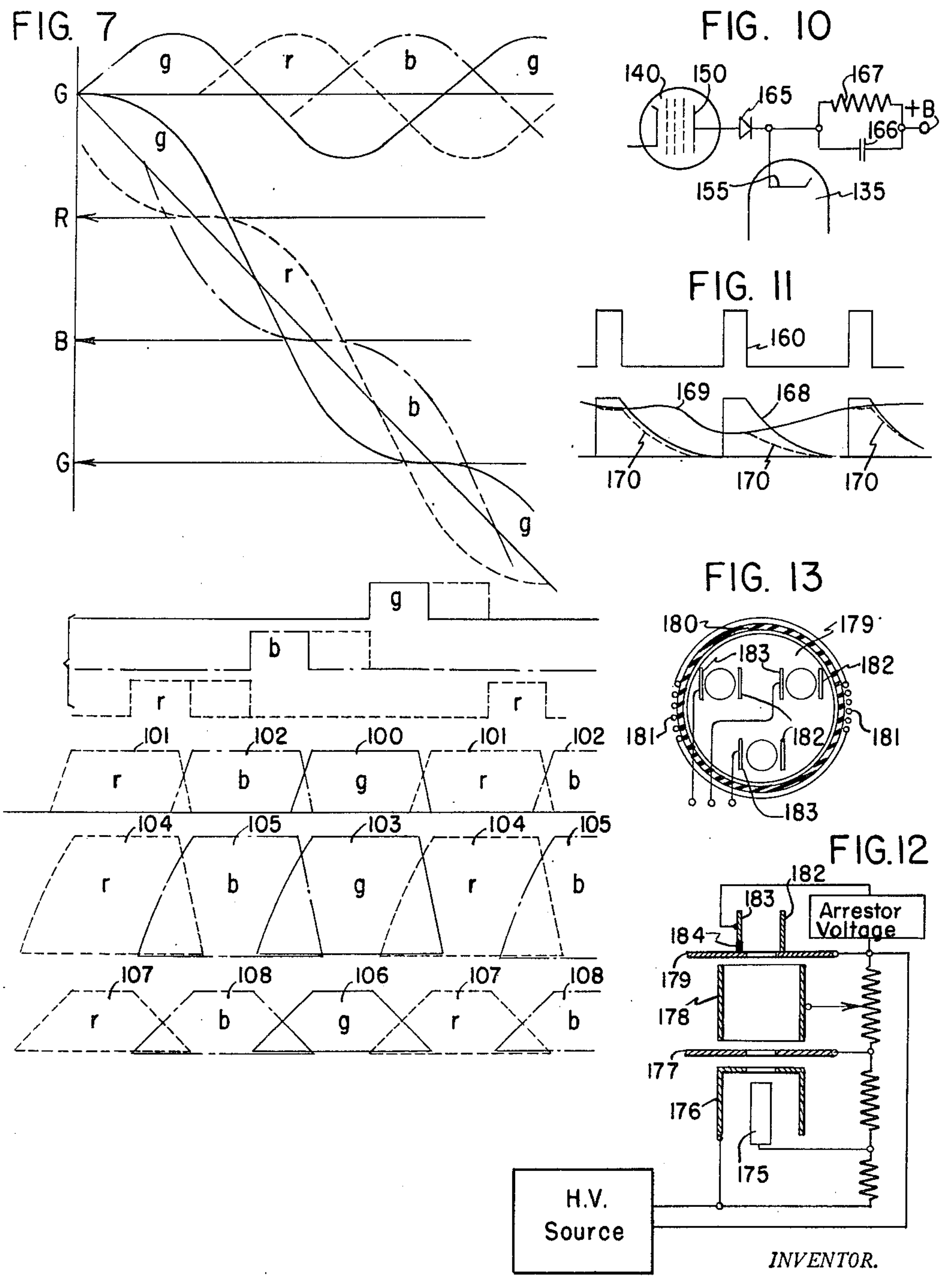
Fig. 7 illustrates the application of the invention to a color television receiver.
Figs. 10 and 11 illustrate the circuit and operation of a modified gating circuit.
Figs. 12 and 13 illustrate the application of the invention to a television tube including a plurality of electron guns in a single tube neck.

As previously stated, the dot arresting technique is applicable to dot interlace color television systems and provides advantageous results at both the sending and receiving stations. At the transmitter, the signal to noise ratio is improved and at the receiver the brightness is increased. The reduction of color cross talk is present at both transmitting and receiving stations. Fig. 7 illustrates the application of the dot arresting technique in a dot-sequential color television system with the curves labeled G, R and B representing the scanning of the green, red and blue dots, respectively. The arresting fields and the scanning movement curves are as would be expected from a consideration of Fig. 2. The gating pulse waves are shown for the short 16% sampling pulses which have been proposed and also in a dotted position for longer 33⅓% sampling pulses. The curves indicated 100, 101, 102 show the light distribution of the green, red and blue dots respectively when 16% sampling pulses are used. The curves indicated 103, 104 and 105 represent the light distribution when sampling pulses of 33⅓% are used and it is apparent that greatly increased brightness is provided by longer sampling. The curves indicated 106, 107 and 108 illustrate the light distribution from standard dot interlace color systems without application of the dot arresting technique. It is noted that the dot overlap provided by short sampling pulses when using the dot arresting technique is considerably less than in the standard dot interlace system, and that the brightness is substantially the same. The brightness can be doubled by increasing the sampling width (curves 103, 104 and 105) and this results in color overlap of substantially the same amount as in the standard dot interlace system wherein the light output is much less.

Figures 8, 9:
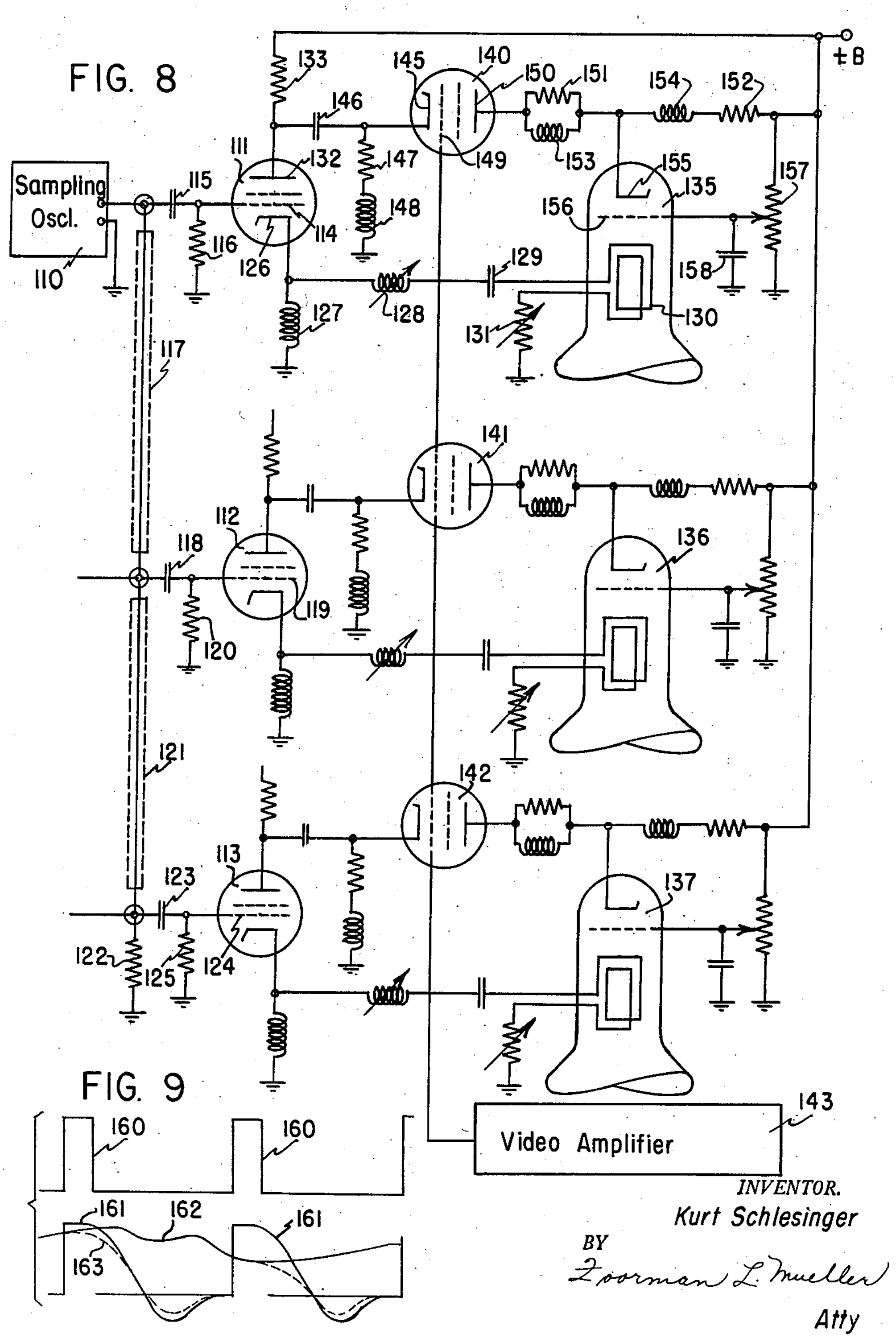
Fig. 8 is a circuit suitable for use in applying the invention to a color television receiver.
Fig. 9 is a chart showing the operation of the gating circuit of Fig. 8.

It may be desirable in some instances to use short sampling to obtain the advantages thereof and at the same time use long display times. It has been found that light distribution as shown in curves 103, 104 and 105 of Fig. 7 may be produced even though the sampling pulses are held to 16⅔% as in the proposed dot sequential system. This may be accomplished by utilizing circuits as illustrated in Fig. 8. In this figure the system is applied to a color receiver in which three separate electron gun structures are used.

In the system of Fig. 8 the sampling oscillator 110 may be similar to the sampling oscillator used in proposed dot interlace color television systems. The oscillator is coupled to and serves to selectively key the tubes 111, 112 and 113. The oscillator is connected to the grid 114 of the keying tube 111 through condenser 115 and across resistor 116. The keying tube 111 has a cathode 126 connected to ground through coil 127 with the voltage across the coil being applied through a tuning inductance 128 and condenser 129 to the arresting yoke 130 which is connected through the adjustable resistance 131 to ground. A sine wave current is thus applied to the arresting yoke 130 so that this yoke operates in a manner previously described. The plate 132 of the keying tube 111 is connected to plus B through resistor 133.

Separate video output tubes 140, 141, and 142 are provided for each of the electron gun structures, with the video signal being applied from video amplifier 143 in parallel to the grids of the video output tubes. The cathode 145 of the video output tube 140 is connected through condenser 146 to the plate 132 of gating tube 111 so that the gating tube renders the output tube conducting. Resistor 147 and coil 148 provide a coupling network which passes ten megacycles across which the gating pulses are applied. As previously stated, the grid 149 of the tube 140 is connected to video amplifier 143 and the plate 150 thereof is connected to an output circuit including resistors 151 and 152 and coils 153 and 154 which are connected to plus B and to the cathode 155 of the electron gun 135. The grid 156 of the gun is connected to a biasing potential through potentiometer 157 and is bypassed by condenser 158. The sampling oscillator 110 is also connected to the keying tubes 112 and 113, being connected to tube 112 through delay line 117 in series with condenser 118 which is connected to the grid 119 of the tube 112. Resistor 120 provides bias to the grid 119. The sampling oscillator is connected to the keying tube 113 through delay lines 117 and 121, across resistor 122 and through condenser 123 to the grid 124 of tube 113, the grid being biased by resistor 125. The video output tubes 141 and 142 are connected to the gating tubes 112 and 113 and the electron guns 136 and 137 in the same manner as described in connection with the output tube 140, and therefore detailed description is not necessary.

The electron gun 135 may provide the green color, the gun 136 providing red, and the gun 137 providing blue. The delay of red and blue beams with respect to the green beam, which will be produced by the delay lines 117 and 121, will result in a reproduction similar to that shown in Fig. 7. By providing the system of separate gating tubes and output tubes as shown, it is possible to control the gating and display cycles independently. The gating time is kept short by the condenser 115 and resistor 116 so that the tube 111 will be held conductive for a brief period only. The plate current will flow through the output tube 140 only for this brief period but the voltage applied to the cathode 155 will be stretched because the network 151, 152, 153 and 154 is a low pass filter which passes only the fundamental sine wave. This is illustrated in Fig. 9 in which the curve 160 illustrates a gating pulse having a duration of 16% and the stretching of the gating pulse is illustrated by the curve 161. When sampling the video signal 162 the signal applied to the cathode of the cathode ray tube will take the form shown by the dotted curve 163. The display time of the individual dots may be further controlled by adjusting the bias to the grid 156 through the variable resistor 157.

An alternative circuit for extending the effective duration of the sampling pulses is illustrated in Fig. 10. Fig. 10 shows a section of a modified circuit which may be used in the overall circuit of Fig. 8 with the gating tube 140 being coupled to the cathode 155 of the electron gun 135 by a rectifying element 165 connected in series with a condenser 166 shunted by a resistor 167. The voltage applied by the rectifier to the condenser 166 will in effect extend the pulse so that the wave 160 will in effect appear as the wave 168. These pulses will sample the video wave 169 to produce signals at the cathode 155 as shown by the wave 170.

It will appear from the above that the additional circuits required to provide arrested dot interlace is not substantially more than that required for standard dot interlace in which the beam is swept linearly. As fully set forth above, important advantages are obtained from arresting the dot. The manner of application of the arresting technique to various types of color tubes will depend upon the construction of the tubes. In the event that the three electron guns are provided in a single tube neck, it may be desirable to provide electrostatic deflecting electrodes for the arresting field instead of coils for producing magnetic fields as has been illustrated. The manner in which electrostatic plates can be energized to provide the desired fields will be obvious to those skilled in the art.

As previously stated, the arresting field may be provided by electrostatic deflection as well as electromagnetic deflection. The use of electrostatic deflection may be particularly advantageous for color television tubes in which a plurality of guns are provided in a single tube neck. In Figs. 12 and 13 the manner in which such tubes may be constructed is illustrated. Fig. 12 illustrates schematically the structure of a single gun of the tube with the gun including a cathode 175, a grid 176, a first anode 177, a focusing electrode 178 and a second anode 179. As is shown in Fig. 13, the second anode for all three electron guns may be formed as a single member and may fit within the neck 180 of a cathode ray tube. The coil 181 represents the coils of the horizontal deflecting system for providing linear deflection of the beam across the screen of the tube. At each opening in the anode 179 for receiving one of the beams, deflection plates 182 and 183 are provided. The plate 182 is connected directly to the second anode 179 and the plate 183 is insulated therefrom by a member 184. A sine wave voltage for providing the arresting field may then be applied between the electrodes 182 and 183 to modulate the linear horizontal deflection field produced by the coil 181. It is to be pointed out that the specific structure of the deflecting electrodes 182 and 183 is merely illustrative and various other configurations may be suitable.

Figure 14:
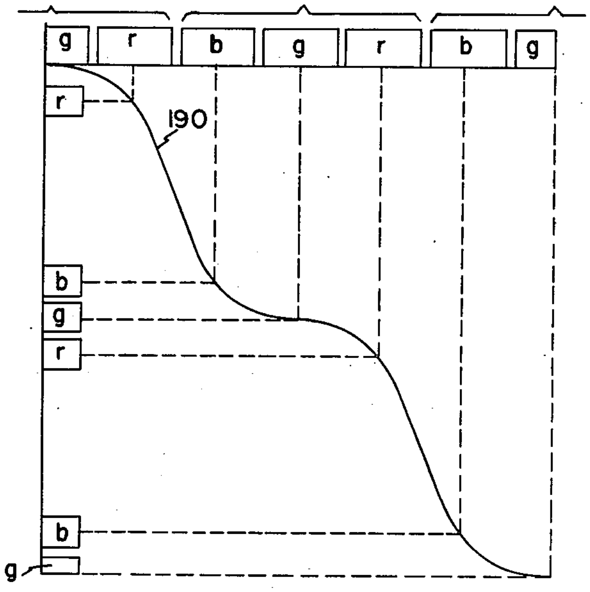
Fig. 14 illustrates a group arresting sweep system in accordance with the invention.

Advantageous results may also be provided in the event a single electron gun or a single tube neck including a plurality of guns is used, by arresting the various dots in groups. This is illustrated in Fig. 14 in which the curve 190 shows the arrested sweep wave as previously illustrated. The amplitude of the arresting wave may be such that dots of the three colors are all arrested by each arresting cycle. The arrested wave may be phased so that the green dot is displayed when the dot is substantially at rest, and red and blue dots are displayed before and after the green dot while the dot is not yet in full motion, and the desired color mixture may thereby be obtained. It is apparent from Fig. 14 that the dots of various colors which are uniformly positioned in time as shown along the top of the curve will be bunched in space as shown along the left hand side of the curve. The gap between each group will then be filled in by the next line scan. In such a system, a single yoke may be provided for arresting beams reproducing the three colors or for arresting a single beam which reproduces all three colors.

The dot arresting technique as has been described may also be applied advantageously to field sequential color television systems. Such a system will be very much like the monochrome television systems disclosed in Figs. 3, 5 and 6 since only one color will be handled at a time. Systems similar to those shown in Figs. 7, 8, 12 and 13 may also be used but will be greatly simplified since only one set of gating and keying tubes and only one arrestor field will be required. This arrestor field may then be either magnetic or electrostatic whichever is most desirable.

It will be apparent from the above that substantial improvement in definition and brightness is obtained by the application of the dot arresting technique to dot interlace scanning systems. When used in color systems, improved color rendition is also provided because the dots may be better separated and color overlap and fringing may therefore be reduced or eliminated. There has been illustrated several embodiments showing the manner in which this technique may be applied both to black and white, and color television systems. It is apparent that the invention may be readily adapted for advantageous use in other types of television systems. As has been fully set forth, the phasing and the duration of the display of the dots may be controlled to provide various different results which may be particularly advantageous in various applications. By following the fundamentals disclosed herein substantial improvements in definition and brightness are provided wherever dot interlace is used. This may include a wide variety of television systems including high definition monochrome and various color systems.

Although certain embodiments of the invention have been described which are illustrative thereof, it is obvious that various changes and modifications can be made in the system within the intended scope of the invention as defined in the appended claims.

I claim:

1. In television apparatus having a cathode ray tube including a screen and means for producing an electron beam which impinges the screen, the combination including, means for deflecting said beam across said screen providing a field having a first component fluctuating at a first frequency with substantially linear trace portions, and a second component alternating at a second frequency substantially greater than said first frequency, so that the alternations of said second component reinforce and oppose said first component during said linear trace portions and said components together cause each trace of said beam to alternately include movement at fast and slow rates, with said first and second frequencies being so related to each other and to the beam that the total movement of the beam resulting from successive fast and slow movements thereof is of the order of twice the transverse dimension of the beam, said deflecting means including oscillator means for providing a wave of said second frequency, gating means connecting said oscillator means to the beam producing means and applying a gating wave of said second frequency thereto for intermittently extinguishing the beam, said oscillator means controlling the frequency and phase of said second component of said field and said gating wave so that said beam is extinguished during the movement thereof at said fast rate, whereby a plurality of substantially stationary discontinuous dots are produced on said screen, and means coupled to said beam producing means for modulating the intensity of the beam to thereby control the intensity of said dots.

2. In television apparatus having a cathode ray tube including a screen and means for producing an electron beam which impinges the screen, the combination including, means for deflecting said beam across said screen providing a field having a first component fluctuating at a first frequency with substantially linear trace portions, and a second component alternating at a second frequency substantially greater than said first frequency, so that the alternations of said second component reinforce and oppose said first component during said linear trace portions and said components together cause each trace of said beam to alternately assume fast and slow rates, oscillator means coupled to said deflecting means applying a sine wave of said second frequency thereto, gating means connected to said oscillator and producing a gating voltage wave of substantially square wave form and at said second frequency with the phase of the fundamental component thereof leading the phase of said sine wave by substantially 90°, said gating means being connected to said beam producing means for applying said gating voltage wave thereto so that said beam is extinguished during the trace thereof at said fast rate, whereby a plurality of substantially stationary discontinuous dots are produced on said screen, and means coupled to said beam producing means for modulating the intensity of the beam to thereby control the intensity of said dots.

3. In television apparatus including a cathode ray tube having means for producing a cathode ray beam which impinges the screen of said tube, and means adjacent said beam for producing a first field which causes the beam to scan the screen in recurring cycles including traces having a substantially constant rate of movement, the combination including, oscillator means operating at a predetermined frequency substantially greater than the scanning frequency, a yoke about said tube for producing an auxiliary deflecting field, said oscillator means including a portion connected to said yoke for applying thereto a current sine wave of said predetermined frequency so that said auxiliary field alternately reinforces and opposes the first field and the beam scans the screen at alternately relatively slow and relatively fast rates, said oscillator means including a portion connected to said cathode ray beam producing means for applying thereto a blanking wave at said predetermined frequency for extinguishing said beam, said oscillator means controlling the phase relationship between said current wave and said blanking wave so that said beam is extinguished during the fast portions of the scan thereof across said screen to form substantially stationary dots, and means connected to said beam producing means for controlling the intensity of the beam and thereby controlling the intensity of the dots.

4. In television apparatus including a cathode ray tube having means for producing a cathode ray beam which impinges the screen of said tube, and means adjacent said beam for producing a first field which causes the beam to scan the screen in recurring cycles including traces having a substantially constant rate of movement, the combination including, oscillator means operating at a predetermined frequency substantially greater than the scanning frequency, a yoke about said tube for producing an auxiliary deflecting field, said oscillator means including a portion connected to said yoke for applying a current sine wave of said predetermined frequency thereto so that said auxiliary field alternately reinforces and opposes the first field and the beam scans the screen at alternately relatively slow and relatively fast rates, said oscillator means including a blanking portion for developing a voltage wave at said predetermined frequency with the phase of the fundamental component thereof leading the phase of said current wave by substantially 90°, said blanking portion being connected to said beam producing means and applying said voltage wave thereto for extinguishing said beam during the fast portions of the scan thereof across said screen so that said beam produces substantially stationary discontinuous dots on the screen, and means connected to said beam producing means for controlling the intensity of the beam and thereby controlling the intensity of the dots.

5. In television apparatus including a cathode ray tube having means for producing a cathode ray beam which impinges the screen of said tube, and means adjacent said beam for producing a first field which causes the beam to scan the screen in recurring cycles including traces having a substantially constant rate of movement, the combination including, oscillator means operating at a predetermined frequency substantially greater than the scanning frequency, a yoke about said tube for producing an auxiliary deflecting field, said oscillator means including a portion connected to said yoke for applying a current sine wave of said predetermined frequency thereto so that said auxiliary field alternately reinforces and opposes the first field and the beam scans the screen at alternately relatively slow and relatively fast rates, said oscillator means including a blanking portion for developing a voltage wave of substantially square wave form at said predetermined frequency, said blanking portion including adjustable phase control means for controlling the phase of the fundamental component of said voltage wave so that it leads the phase of said current wave through a range extending above and below 90°, said blanking portion being connected to said beam producing means and applying said voltage wave thereto for extinguishing said beam during the fast portions of the scan thereof across said screen so that said beam produces on said screen substantially stationary discontinuous dots, and means connected to said beam producing means for controlling the intensity of the beam and thereby controlling the intensity of the dots.

6. In television apparatus including a cathode ray tube having means for producing a cathode ray beam which impinges the screen of said tube, and means adjacent said beam for producing a first field which causes the beam to scan the screen in recurring cycles including traces having a substantially constant rate of movement, the combination including, oscillator means operating at a predetermined frequency substantially greater than the scanning frequency, a yoke about said tube for producing an auxiliary deflecting field, said oscillator means including a portion connected to said yoke for applying a current sine wave of said predetermined frequency thereto so that said auxiliary field alternately reinforces and opposes the first field and the beam scans the screen at alternately relatively slow and relatively fast rates, said oscillator means including a blanking portion for developing a voltage wave of substantially square wave form at said predetermined frequency, said blanking portion including phase shift means for controlling the phase of the fundamental component of said voltage wave so that the same leads the phase of said current wave by an angle in the range from 90° to 120°, said blanking portion being connected to said beam producing means and applying said voltage wave thereto for extinguishing said beam during the fast portions of the scan thereof across said screen so that said beam produces on said screen substantially stationary discontinuous dots, and means connected to said beam producing means for controlling the intensity of the beam and thereby controlling the intensity of the dots.

7. In a dot interlace television system having means for producing a plurality of cathode ray beams which impinge a screen, and means for producing a repeating linear deflection field adjacent said beams, the combination including, a plurality of deflecting means individually positioned adjacent said beams for producing a separate auxiliary deflecting field adjacent each beam, oscillator means including a plurality of arresting portions individually connected to said deflecting means applying an alternating wave to each deflecting means having a predetermined frequency much greater than the frequency of said linear deflecting field, each of said deflecting means producing an auxiliary field in phase with said alternating wave applied thereto, with said auxiliary fields alternately reinforcing and opposing said linear deflecting field and causing said beams to scan said screen at alternately relatively fast and relatively slow rates, said oscillator means including blanking portions individually coupled to said cathode ray beam producing means providing blanking waves of said predetermined frequency thereto for selectively extinguishing said beams, said blanking waves being so related in phase to said alternating waves that each beam is blanked during the fast movement thereof so that each beam forms recurring separate dots on the screen, said arresting and blanking portions of said oscillator means being interconnected and the waves therefrom being so correlated that the dots produced by the individual beams occur in turn, and means modulating said beams for controlling the intensity of said dots.

8. In a dot interlace television system having means for producing first, second and third cathode ray beams which impinge a screen, and means for producing a repeating linear deflection field adjacent said beams, the combination including, first, second, and third deflecting means individually positioned adjacent said beams for producing a separate auxiliary deflecting field adjacent each beam, oscillator means including first, second, and third arresting portions individually connected to said deflecting means applying an alternating wave to each deflecting means having a predetermined frequency much greater than the frequency of said linear deflecting field, with the waves applied to said first, second, and third portions being uniformly displaced in phase with respect to each other so that they follow each other by delays of 120°, each of said deflecting means producing an auxiliary field in phase with the alternating wave applied thereto with said auxiliary fields alternately reinforcing and opposing said linear deflecting field and causing said beams to scan said screen at alternately relatively fast and relatively slow rates, said oscillator means including first, second, and third blanking portions individually coupled to said cathode ray beam producing means providing blanking waves of said predetermined frequency thereto for selectively extinguishing said beams, said blanking waves from each blanking portion being delayed in phase by the order of 120° with respect to said alternating wave of the associated arresting portion so that each beam is blanked during the fast movement thereof and the beam forms recurring separate dots on the screen, with the phase relation between the waves being such that the dots produced by the individual beams occur in turn, and means modulating said beams for controlling the intensity of said dots.

9. In a dot interlace color television system having means for producing first, second and third cathode ray beams which impinge a screen, and means for producing a repeating linear deflection field adjacent said beams, the combination including, first, second, and third deflecting means individually positioned adjacent said beams for producing a separate auxiliary deflecting field adjacent each beam, oscillator means including first, second, and third arresting portions individually connected to said deflecting means applying an alternating wave to each deflecting means having a predetermined frequency much greater than the frequency of said linear deflecting field, with the waves applied to said first, second, and third portions being uniformly displaced in phase with respect to each other so that they follow each other with phase delays of 120°, each of said deflecting means producing an auxiliary field in phase with the alternating wave applied thereto with said auxiliary fields alternately reinforcing and opposing said linear deflecting field and causing said beams to scan said screen at alternately relatively fast and relatively slow rates, means modulating said beams for controlling the intensity thereof in accordance with a signal, said oscillator means including first, second, and third gating portions selectively coupling said modulating means to said first, second, and third cathode ray beam producing means respectively for selectively energizing said beams, said gating means energizing each beam during the slow movement thereof so that the beam forms recurring separate dots on the screen, with the phase relation between the gating portions being such that the dots produced by the individual beams occur in turn.

10. In a color television system including a cathode ray tube having means for producing a cathode ray beam which impinges the screen of said tube, and means adjacent said beam for producing a first field which causes the beam to scan the screen in recurring cycles including traces having a substantially constant rate of movement, the combination including, oscillator means operating at a predetermined frequency substantially greater than the scanning frequency, deflecting means adjacent said tube for producing an auxiliary deflecting field, said oscillator means including a portion connected to said deflecting means for applying a sine wave of said predetermined frequency thereto so that said auxiliary field alternately reinforces and opposes the first field and the beam scans the screen at alternately relatively slow and relatively fast rates, means providing modulating signals representing different colors, said oscillator means including a portion connected to said cathode ray beam producing means for selectively applying said modulating waves thereto at said predetermined frequency, said oscillator means controlling the application of said modulating signals so that the signal representing the color providing the most definition is applied during the slow portions of the scan thereof across said screen and the signals representing the other colors are applied during the faster portions of the scan.

References Cited in the file of this patent

UNITED STATES PATENTS

| | | |
|---|---|---|
| 1,161,734 | Rosing | Nov. 23, 1915 |
| 2,034,704 | Nakashima | Mar. 24, 1936 |
| 2,037,577 | Harries | Apr. 14, 1936 |
| 2,093,157 | Nakashima et al. | Sept. 13, 1937 |
| 2,277,192 | Wilson | Mar. 24, 1942 |
| 2,423,304 | Fitch | July 1, 1947 |
| 2,431,115 | Goldsmith | Nov. 18, 1947 |
| 2,439,321 | Starr | Apr. 6, 1948 |
| 2,479,880 | Toulon | Aug. 23, 1949 |
| 2,543,434 | Bryan et al. | Feb. 27, 1951 |
| 2,547,289 | Smart | Apr. 3, 1951 |
| 2,560,168 | Goldsmith | July 10, 1951 |
| 2,561,586 | Montgomery | July 24, 1951 |
| 2,576,859 | Schroeder | Nov. 27, 1951 |

FOREIGN PATENTS

| | | |
|---|---|---|
| 2,586,957 | Keizer | Feb. 26, 1952 |
| 2,623,196 | Toulon | Dec. 23, 1952 |

OTHER REFERENCES

RCA Television, vol. VI, published by RCA Review, "Six-Megacycle Color Television," pages 270–290.